United States Patent Office 3,156,704
Patented Nov. 10, 1964

3,156,704
ARYLCYANOMETHYLENE QUINONE OXIMES
AND THEIR DERIVATIVES
Ralph B. Davis, Notre Dame, Ind., assignor to University of Notre Dame, Notre Dame, Ind.
No Drawing. Filed Apr. 12, 1960, Ser. No. 21,622
3 Claims. (Cl. 260—396)

This invention relates to new chemical compounds, and more specifically arylcyanomethylene quinone oximes and their derivatives, and to methods for preparing the same.

Neresheimer and Ruppel, U.S. Patent 2,080,057, show the condensation of certain aromatic nitro compounds with active methylene compounds in the presence of an alkali metal hydroxide, with pyridine as a diluent. While reference is made therein to the use of various other diluents, the only reactions involving aryl acetonitriles apparently were actually carried out with pyridine as a diluent or without any diluent. The products obtained by Neresheimer and Ruppel are nitrodiphenyl acetonitrile and hydroxylamino-diphenyl acetonitrile compounds.

Illustrative of the compounds obtained by Neresheimer and Ruppel is that obtained in accordance with their Examples 2 and 3 wherein pyridine is used in Example 2 and no solvent is used in Example 3, and in both cases the same product is obtained. Example 2 shows the reaction of benzyl cyanide with nitrobenzene in the presence of potassium hydroxide and pyridine.

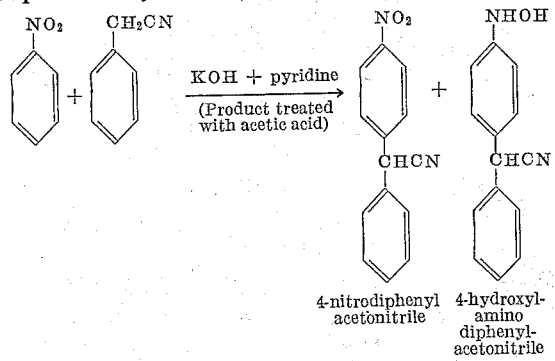

4-nitrodiphenyl acetonitrile  4-hydroxyl-amino diphenyl-acetonitrile

When Example 2 is repeated by the authors without using any diluent, the same 4-hydroxylamino-diphenylacetonitrile is obtained.

When an aryl nitro compound is used in which the para position is occupied by a halo group or methoxy group, the reaction proceeds in pyridine by the elimination of this para-substituent. Thus according to Example 1 of the aforesaid patent the reaction proceeds as follows:

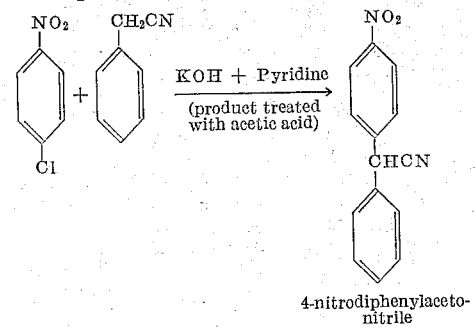

4-nitrodiphenylacetonitrile

Most surprisingly it has now been found that when an aryl acetonitrile compound is condensed with an aromatic nitro compound, unsubstituted in the position para to the nitro group or unsubstituted in a position ortho to the nitro group when the para position is occupied by a halo group, in an aqueous or alcoholic solution instead of the pyridine or in the absence of a solvent, as shown by Neresheimer and Ruppel, an entirely different reaction results to give in very good yields a product having a quinone type structure.

The new reactions proceed as follows:

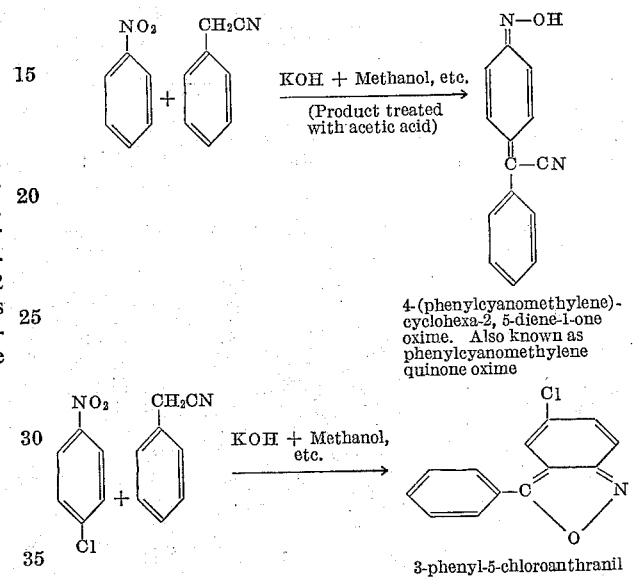

4-(phenylcyanomethylene)-cyclohexa-2, 5-diene-1-one oxime. Also known as phenylcyanomethylene quinone oxime 3-phenyl-5-chloroanthranil It will be noted in the second reaction where the aryl-nitro reagent has a halo substituent in the position para to the nitro group, this para-substituent is not displaced as in the reaction conducted in pyridine. Moreover, the reaction product retains this substituent in the same position, it has an ortho-quinone type of structure, and it can be considered as being derived from an arylcyanomethylene o-quinone oxime.

The displacement of para halo substituents is further evidence that a different type of reaction takes place when pyridine is used as a solvent as shown by Neresheimer and Ruppel, as compared to the use of aqueous or alcoholic media as solvent. Thus, in Example 1 of the aforesaid patent, where the para position of the aryl nitro reagent is occupied by a chloro group, the said chloro group has been displaced and is not present in the product. In contrast when condensation of the same halo reagent is effected in alcoholic solution, the substituent in the para position is not displaced. The reaction product thus retains the para halo substituent and is an anthranil derivative having a 1,2-quinoid structure.

It has been found that this new reaction is promoted when the diluent is water, a lower alcohol, or a glycol, or mixtures thereof, the alcohol or glycol preferably having no more than 5 carbon atoms.

The following table illustrates the type of products obtained from similar combinations of reagents but using different solvents.

TABLE I

| Aryl acetonitrile | Aryl nitro compound | Solvent | Product (percent yield) |
|---|---|---|---|
| Benzyl cyanide | Nitrobenzene | Pyridine | 4-NO₂-diphenylacetonitrile and 4-hydroxylamino-diphenylacetonitrile (Neresheimer et al Ex. 2). |
| Do | do | Methanol | 4-(phenylcyanomethylene)-cyclohexa-2,5-diene-1-one oxime (92%). |
| Do | do | Water | Do. |
| Do | 2-chloro-nitrobenzene | Pyridine | Cl-NO₂-diphenylacetonitrile (Neresheimer et al Ex. 11). |
| Do | do | Methanol | 2-Cl-4-(phenylcyanomethylene)-cyclohexa-2,5-diene-1-one oxime (92% yield). |
| Do | o-Nitroanisole | Pyridine | Hydroxylamino-methoxy-diphenylacetic nitrile (Neresheimer et al Ex. 18). |
| Do | do | Methanol | 2-MeO-4-(phenylcyanomethylene)-cyclohexa-2,5-diene-1-one oxime (79% yield). |
| Do | p-Cl-nitrobenzene | Pyridine | p-NO₂-diphenylacetonitrile (68% yield) (Neresheimer et al Ex. 1). |
| Do | do | Methanol | 3-phenyl-5-Cl-anthranil (46% yield). |
| p-Cl-benzyl cyanide | do | Pyridine | p-Cl-phenyl-p-NO₂-phenylacetonitrile (86% yield). |
| Do | do | Methanol | 3-(p-Cl-phenyl)-5-Cl-anthranil (46% yield). |
| p-MeO-benzyl cyanide | do | Pyridine | p-MeO-phenyl-p-NO₂-phenylacetonitrile (p-MeO-p'-NO₂-diphenylacetonitrile) (65%). |
| Do | do | Methanol | 3-(p-MeO-phenyl)-5-Cl-anthranil (49%). |
| Benzyl cyanide | p-Br-nitrobenzene | Pyridine | p-NO₂-diphenylacetonitrile (76%). |
| Do | do | Methanol | 3-phenyl-5-Br-anthranil (79%). |
| p-Cl-benzyl cyanide | do | Pyridine | p-NO₂-phenyl-p-Cl-phenylacetonitrile (p-NO₂-p'-Cl-diphenylacetonitrile) (87%). |
| Do | do | Methanol | 3-(p-Cl-phenyl)-5-Br-anthranil (48%). |
| p-MeO-benzyl cyanide | do | Pyridine | p-NO₂-phenyl-p-MeO-phenylacetonitrile (65%). |
| Do | do | Methanol | 3-(p-MeO-phenyl)-5-Br-anthranil (69%). |

New chemical compounds of this invention can be represented by the following general Formulas I and II:

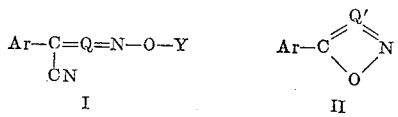

in which Ar is an aromatic group, Q is a 1,4-quinoid group, Q' is a 1,2-quinoid group selected from the class consisting of 1,2-quinoid groups having a substituent in the position para to N, said substituent being selected from the class consisting of bromo, fluoro and iodo substituents, and 1,2-quinoid groups having a chloro substituent para to N and at least one other substituent in addition to C, N and chloro, and Y is a metal, hydrogen, or an alkyl, alkenyl, alkynyl, acyl, —CONHR, or —CONHAr' group, in which R is hydrogen, or an alkyl group, including hydrocarbon-substituted alkyl groups, and Ar' is an aryl group.

Illustrative examples of the aromatic groups that Ar in the above Formulas I and II can represent include, but are not restricted to:

—$C_6H_5$, —$C_6H_4Cl$, —$C_6H_4Br$, —$C_6H_4F$, —$C_6H_4I$,
—$C_6H_3Cl_2$, —$C_6H_4NH_2$, —$C_6H_4NO_2$, —$C_6H_4CN$,
—$C_6H_4CH_2NH_2$, —$C_6H_4NHCH_3$, —$C_6H_4NHC_2H_5$,
—$C_6H_4N(CH_3)_2$, —$C_6H_4COOH$, —$C_6H_4COOCH_3$,
—$C_6H_4COOK$, —$C_6H_4COONa$, —$C_6H_4COOC_2H_5$,
—$C_6H_4CH_2CN$, —$C_6H_4OH$, —$C_6H_4OK$, —$C_6H_4ONa$,
—$C_6H_4OCH_3$, —$C_6H_4OC_2H_5$, —$C_6H_4SO_3K$,
—$C_6H_4SO_3Na$, —$C_6H_4SO_3H$, —$C_6H_4COCH_3$,
—$C_6H_4OCOCH_3$, —$C_6H_4CH_3$, —$C_6H_4C_2H_5$,
—$C_6H_4C_3H_7$, —$C_6H_3(CH_3)_2$, —$C_6H_3Cl(CH_3)$,
—$C_6H_3Cl(CN)$, —$C_6H_4C_6H_5$, —$C_{10}H_7$, —$C_{10}H_9$,
—$C_{10}H_{11}$—$C_{10}H_6Cl$, —$C_{10}H_5CH_3$, —$C_{10}H_6OCH_3$,
—$C_6H_4C_6H_{11}$, —$C_6H_4C_6H_4CH_3$, —$C_6H_4C_6H_4Cl$,
—$C_{14}H_9$, —$C_{14}H_8OCH_3$, —$C_{14}H_8CH_3$, —$C_{14}H_8Cl$,
—$C_{14}H_{11}$, —$C_{14}H_{13}$, —$C_{14}H_{15}$, —$C_{14}H_{17}$,
—$C_{14}H_{12}OCH_3$, —$C_9H_7$, —$C_9H_9$, —$C_9H_5O$, —$C_9H_7O$,
—$C_9H_6OCH_3$, —$C_9H_6Cl$, —$C_9H_8CH_3$, —$C_{13}H_9$,
—$C_{13}H_{11}$, —$C_8H_5S$, —$C_8H_6N$, —$C_3H_5O$, —$C_9H_6N$,
etc.

Illustrative examples of the 1,4-quinoid groups that Q in the above Formula I can represent include, but are not restricted to:

=$C_6H_4$=, =$C_6H_3Cl$=, =$C_6H_3Br$=, =$C_6H_3I$=,
=$C_6H_3F$=, =$C_6H_2Cl_2$=, =$C_6H_3OCH_3$=,
=$C_6H_3OC_2H_5$=, =$C_6H_3OCOCH_3$=,
=$C_6H_3COOCH_3$=, =$C_6H_3CN$=, =$C_6H_3CH_2NH_2$=,
=$C_6H_3COOH$=, =$C_6H_3COONa$=, =$C_6H_3COOK$=,
=$C_6H_3COOCH_3$=, =$C_6H_3COOC_2H_5$=,
=$C_6H_3N(CH_3)_2$=, =$C_6H_3NO_2$=, =$C_6H_3SO_3H$=,
=$C_6H_3SO_3Na$=, =$C_6H_3SO_3K$=, =$C_6H_3CH_3$=,
=$C_6H_3C_2H_5$=, =$C_6H_3C_3H_7$=, =$C_6H_2(CH_3)_2$=,
=$C_6H_2(OCH_3)_2$=, =$C_6H_2Cl(OCH_3)$=,
=$C_6H_2Cl(CH_3)$=, =$C_6H_3C_6H_5$=, =$C_{10}H_6$=,
=$C_{10}H_8$=, =$C_{10}H_{10}$=, =$C_{10}H_5Cl$=, =$C_{10}H_5F$=,
=$C_{10}H_5Br$=, =$C_{10}H_5CH_3$=, =$C_{10}H_5OCH_3$=, etc.

The substituents attached to the 1,4-quinoid structures in the 1,4-quinoid groups represented by Q in this list can be in positions ortho to the 1 and 4 positions, that is, in the positions commonly numbered as the 2, 3, 5 and 6 positions. Likewise some of these substituents can be in the form of fused ring systems attached to adjacent positions such as the 2,3 positions and the 5,6 positions, and in such cases, additional substituents can be attached to the fused ring systems.

Illustrative examples of the 1,2-quinoid groups having a bromo, iodo or fluoro substituent in the position para to N and 1,2-quinoid groups having a chloro substituent para to N and at least one other substituent in addition to C, N and chloro that Q' in the above Formula II can represent include, but are not restricted to:

=$C_6H_3Br$=, =$C_6H_3I$=, =$C_6H_3F$=, =$C_6H_2Br(Cl)$=,
=$C_6H_2Br_2$=, =$C_6H_2I(Cl)$=, =$C_6H_2I(Br)$=,
=$C_6H_2I_2$=, =$C_6H_2F_2$=, =$C_6H_2Br(CH_3)$=,
=$C_6H_2I(CH_3)$=, =$C_6H_2F(CH_3)$=,
=$C_6H_2Br(C_2H_5)$=, =$C_6H_2Br(C_3H_7)$=
=$C_6H_2Br(OCH_3)$=, =$C_6H_2I(OCH_3)$=,
=$C_6H_2Br(OC_2H_5)$=, =$C_6H_2Br(CN)$=,
=$C_6H_2I(CN)$=, =$C_6H_2F(CN)$=,
=$C_6H_2Br(COOH)$=, =$C_6H_2I(COOH)$=,
=$C_6H_2Br(COOK)$=, =$C_6H_2Br(COONa)$=,
=$C_6H_2Br(SO_3H)$=, =$C_6H_2Br(SO_3K)$=,
=$C_6H_2Br(SO_3Na)$=, =$C_{10}H_5Br$=, =$C_{10}H_5I$=,
=$C_{10}H_5F$=, =$C_{10}H_4Br(OCH_3)$=,
=$C_{10}H_4I(OCH_3)$=, =$C_{10}H_4F(OCH_3)$=,
=$C_{10}H_4Br(CH_3)$=, =$C_{10}H_4I(CH_3)$=,
=$C_{10}H_4Br(Cl)$=, =$C_{10}H_4Br_2$=, =$C_{10}H_4I_2$=,
=$C_{10}H_4F_2$=, =$C_{10}H_7Br$=, =$C_{10}H_7I$=, =$C_{10}H_7F$=,
=$C_{10}H_6Br_2$=, =$C_{10}H_7I_2$=, =$C_{10}H_9Br$=, =$C_{10}H_9I$=,
=$C_{10}H_9F$=, =$C_{10}H_8Br_2$=, =$C_{10}H_7Cl$=,
=$C_{10}H_6Cl(OCH_3)$=, =$C_{10}H_6Cl_2$=, etc.

The 1,2-quinoid groups represented by Q' in this list can have, in addition to the bromo, iodo and fluoro groups in the position commonly numbered as the 4 position (para to N) and must have in addition to a chloro group in this same position, another substituent or substituents in the positions commonly numbered as the 3, 5 and 6 positions. Likewise some of these substituents can be in the form of fused ring systems attached to the 1,2-quinoid structure at the positions commonly referred to as the 5, 6 positions, and in such cases, additional substituents can be attached to the fused ring systems.

Various substituents in addition to fused ring systems that can be present on the aryl and quinoid groups include, but are not restricted to:

—Cl, —Br, —I, —F, —CH$_3$, —C$_2$H$_5$, —C$_3$H$_7$,
—OH, —ONa, —OK, OCH$_3$, —OC$_2$H$_5$, —OCOCH$_3$,
—COCH$_3$, —CN, —CH$_2$—CN, —CONH$_2$, —COOH,
—COONa, —COOK, —CH$_2$CH$_2$NH$_2$, —SO$_3$H,
—SO$_3$Na, —SO$_3$K, —NO$_2$, —NH$_2$, —CH$_2$NH$_2$,
—NHCH$_3$, —NHC$_2$H$_5$, —N(CH$_3$)$_2$, —N(C$_2$H$_5$)$_2$,
—C$_6$H$_5$, —C$_6$H$_4$Cl, —C$_6$H$_4$CH$_3$, —C$_6$H$_4$OCH$_3$, etc.

Illustrative examples of the groups that Y in the above Formula I can represent include, but are not restricted to: hydrogen, metals such as for example, lithium, sodium, potassium, cadmium, bismuth, chromium, manganese, silver, gold, mercury, titanium, molybdenum, strontium, tungsten, tin, vanadium, beryllium, magnesium, calcium, zinc, barium, iron, cobalt, nickel, aluminum, copper, lead, etc. alkyl, alkenyl and alkynyl as for example, methyl, ethyl, propyl, isopropyl, butyl, secondary butyl, isobutyl, amyl, isoamyl, hexyl, heptyl, octyl, nonyl, decyl, dodecyl, allyl, methallyl, ethallyl, cyclopentyl, cyclopentenyl, cyclohexyl, cyclohexenyl, benzyl, phenylethyl, phenylpropyl, propargyl, butynyl, pentynyl, hexynyl etc., acyl as for example, HCO—, CH$_3$CO—,

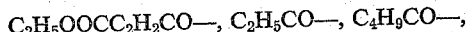

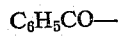

(HOOC)C$_6$H$_4$CO—, CH$_3$C$_6$H$_4$CO—, etc., and also —CONHR and —CONHAr′ groups, such as for example, —CONH$_2$, —CONHCH$_3$, —CONHC$_4$H$_9$,

—CONHCH$_2$C$_6$H$_5$, —CONHC$_6$H$_5$, —CONHC$_{10}$H$_7$, etc.

While even larger groups can be used it is found that there is no particular advantage in having groups of more than about 20 carbon groups substituted for Ar, Q, Q′, Y and Ar′, and generally R advantageously has no more than about 12 carbon atoms.

When Y represents a metal having a valency greater than 1, the additional valencies can be attached to other atoms or groups, such as chlorine, bromine, iodine, fluorine, nitrate, sulfate, phosphate, hydroxy, carbonate, or various acyloxy groups, such as acetoxy, propionoxy, etc., as well as to additional Ar—C(CN)=Q=N—O— groups.

The new chemical compounds of this invention have broad applications and many of them can be used specifically as anti-oxidants, as indicators, for example, in acid and base titrations, as dyes, as pigments, as stains and in the isolation of metal cations. Many of them can also be used as chemical intermediates for the syntheses of drugs, dyes, insecticides, agricultural chemicals, plasticizers, polymer stabilizers, curing catalysts for convertible resins, interfacial agents as for example, detergents, emulsifying and suspension agents, and other useful purposes. More specifically, phenylcyanomethylene quinone oxime and other quinone oximes of this invention can be used to color paper and cloth. When white paper is passed through a solution of one of these substances in alcohol and then dried, usually a yellow color is imparted to the paper. When paper so treated is passed through a solution of potassium hydroxide and then dried, usually a reddish-brown color is imparted to the paper. It is readily apparent that such paper can be used for purposes similar to those of blue-printing paper and litmus paper. Phenylcyanomethylene quinone oxime and other quinone oximes of this invention can also be used as indicators, for example in acid and base titrations. In acidic solutions these substances usually display a yellow color. In basic solutions, they usually display a red, violet or brown color. Phenylcyanomethylene quinone oxime and other quinone oximes of this invention are capable of removing oxygen from the air and from solutions, and hence can be used as oxygen scavengers and as anti-oxidants. Some of the metal derivatives, for example, barium derivatives of some quinone oximes of this invention, are relatively insoluble in water solutions. Hence quinone oximes of this invention, preferably as potassium salts, can be used in the removal of certain metal cations from aqueous solutions. The metal salts of the quinone oximes are usually colored, and can be used as pigments.

As previously indicated the arylcyanomethylene quinone oximes can be prepared by the condensation of arylacetonitriles with aromatic nitro compounds in which the position para to the nitro group is unsubstituted. When an arylacetonitrile is condensed in a similar manner with an aromatic nitro compound having a halo substituent in the position para to the nitro group and at the same time being unsubstituted in at least one position ortho to said nitro group, the anthranil or 1,2-quinoid derivative is obtained. When said para halo substituent is a bromo, an iodo or a fluoro group, the anthranils or 1,2-quinoid derivatives are new compounds. When the para halo substituent is a chloro group, some of the anthranils are new compounds, while others are known. For example, 3-(p-chlorophenyl)-5-chloroanthranil and 3-(p-methoxyphenyl)-5-chloroanthranil which were previously cited, are known compounds. However, this method for preparing the anthranils is new.

The condensation of the arylacetonitriles with the aromatic nitro compounds is accomplished by using alkaline condensing agents, such as potassium hydroxide, sodium hydroxide, sodium alkoxides, potassium alkoxides, potassamide, sodamide, etc., in the presence of lower alcohols or glycols (preferably having no more than five carbon atoms), or water, or mixtures thereof. For example, methanol, ethanol, propanol, butanol, ethylene glycol, propylene glycol, methanol-water, ethanol-water, water, etc. can be used as solvents or diluents. The reactions proceed readily at temperatures ranging from about 0° C. to about 80° C. Acidification after reaction, using acids and aqueous solutions of acids such as formic acid, acetic acid, propionic acid, hydrochloric acid, sulfuric acid, phosphoric acid, etc., give high yields of the quinone oxime products. The anthranil or 1,2-quinoid derivatives are best obtained when the reactions are conducted at temperatures ranging from about 0° C. to about 30° C., and the final step, namely acidification after reaction, can be omitted.

It is generally advantageous to use approximately stoichiometric proportions of the arylacetonitriles and the aromatic nitro compounds, although other proportions also give the desired products to the extent that the reagents are available for such reaction. Since metal salts of the quinone oximes are produced prior to the acidification step, it is generally desirable to use an excess of the stoichiometric amount of the alkaline condensing agents. While reaction can proceed when an equivalent amount or even less is used, nevertheless, better yields of product are usually obtained when two, three or four or even more equivalents of alkaline condensing agents are used. While it is generally advantageous to have sufficient diluent present to dissolve the various reagents, particularly the alkaline condensing agents, it is also possible to promote the desired reaction even while only part of the reagents are dissolved, since reaction usually proceeds to the extent that the reagents are dissolved.

Illustrative examples of the arylacetonitriles that can be used in the above reactions include, but are not restricted to the following:

$C_6H_5CH_2CN$, $ClC_6H_4CH_2CN$, $BrC_6H_4CH_2CN$,
$IC_6H_4CH_2CN$, $FC_6H_4CH_2CN$, $Cl_2C_6H_3CH_2CN$,
$CH_3C_6H_4CH_2CN$, $C_2H_5C_6H_4CH_2CN$, $C_3H_7C_6H_4CH_2CN$,
$CH_3OC_6H_4CH_2CN$, $C_2H_5OC_6H_4CH_2CN$,
$C_3H_7OC_6H_4CH_2CN$, $(CH_3)_2NC_6H_4CH_2CN$,
$NCC_6H_4CH_2CN$, $(NC)ClC_6H_3CH_2CN$,
$(CH_3)ClC_6H_4CH_2CN$, $C_{10}H_7CH_2CN$, $C_{10}H_9CH_2CN$,
$C_{14}H_9CH_2CN$, $C_{10}H_{11}CH_2CN$, $C_6H_5C_6H_4CH_2CN$, etc.

Illustrative examples of the aromatic nitro compounds that can be used in the above reactions to produce the quinone oximes or 1,4-quinoid derivatives include, but are not restricted to the following: nitrobenzene, o-chloronitrobenzene, m-chloronitrobenzene, o-bromonitrobenzene, m-bromonitrobenzene, o-methylnitrobenzene, m-methylnitrobenzene, o-ethylnitrobenzene, o-methoxynitrobenzene, m-methoxynitrobenzene, m-nitrophenol, o-ethoxynitrobenzene, o-cyanonitrobenzene, m-cyanonitrobenzene, m-nitrobenzoic acid, m-nitroaniline, 2-methyl-5-chloronitrobenzene, 2-chloro-5-methylnitrobenzene, 2,5-dimethylnitrobenzene, 2-methyl-3-chloronitrobenzene, 2,3-dimethylnitrobenzene, 2,5-dichloronitrobenzene, 2,5-dimethoxynitrobenzene, 2,3-dichloronitrobenzene, 2-methoxy-5-chloronitrobenzene, 1-nitronaphthalene, 1-nitro-2-methylnaphthalene, 1-nitro-2-chloronaphthalene, o-nitrodiphenyl, m-nitrodiphenyl, etc.

Illustrative examples of the aromatic nitro compounds that can be used in the above reactions to produce the anthranils or 1,2-quinoid derivatives include, but are not restricted to: p-bromonitrobenzene, p-chloronitrobenzene, p-iodonitrobenzene, p-fluoronitrobenzene, 3,4-dichloronitrobenzene, 3,4-dibromonitrobenzene, 3,4-difluoronitrobenzene, 3,4-diiodonitrobenzene, 2-chloro-5-nitroanisole, 2-bromo-5-nitroanisole, 2-fluoro-5-nitroanisole, 2-iodo-5-nitroanisole, 2-chloro-5-nitrotoluene, 2-bromo-5-nitrotoluene, 2-fluoro-5-nitrotoluene, 2-iodo-5-nitrotoluene, 2-bromo-5-nitrobenzoic acid, 1-chloro-4-nitronaphthalene, 1-bromo-4-nitronaphthalene, 1-fluoro-4-nitronaphthalene, 1-iodo-4-nitronaphthalene, 1,8-dichloro-4-nitronaphthalene, etc.

The metal derivatives of the arylcyanomethylene quinone oximes of this invention can be prepared by various methods. One method for preparing potassium and sodium salts in high yield is to follow the procedure just previously described for preparing the arylcyanomethylene quinone oximes, omitting, however, the acidification step. Another method for preparing potassium and sodium salts is to treat the arylcyanomethylene quinone oximes with potassium and sodium bases, as for example potassium hydroxide, sodium hydroxide, sodium methoxide, potassium methoxide, etc. The other metal derivatives of this invention may likewise be prepared by various methods. One method for preparing them is to treat solutions of the potassium and sodium salts of the arylcyanomethylene quinone oximes with salts of other metals, as for example, a barium derivative of phenylcyanomethylene quinone oxime can be prepared by treating its potassium salt with barium chloride.

By properly adjusting the proportions of the reagents and other conditions when compounds of the multivalent metals are used, the quinone oxime group can be substituted for only one or for any number of the groups originally attached to the metal. For example, the quinone oxime radical can be substituted accordingly for one or for both of the chlorine atoms of barium chloride so as to give either the dioxime or the chloro-oxime derivative of barium.

Other derivatives of the arylcyanomethylene quinone oximes of this invention can be prepared by appropriate modifications of methods presently available to one skilled in the art for preparing similar derivatives of oximes. For example, the acyl derivatives of the arylcyanomethylene quinone oximes can be prepared by appropriate treatment of the quinone oximes and their potassium and sodium salts with acid anhydrides and acid chlorides. Likewise urethan derivatives of the quinone oximes of this invention can be prepared by appropriate treatment of the quinone oximes with isocyanic acid, alkyl isocyanates and arylisocyanates. The alkyl, alkenyl and alkynyl derivatives of the quinone oximes can be prepared by appropriate treatment of the potassium and sodium salts of the quinone oximes with alkyl, alkyl and alkynyl halides, and alkyl sulfates.

In order that those skilled in the art may better understand how the present invention may be carried into effect, the following examples are given by way of illustration and not by way of limitation. Parts and percentages indicated are parts and percentages by weight.

*Example I*

In a suitable reaction vessel, 396 parts of potassium hydroxide (assay 85%) is dissolved in 1500 parts of methanol. The solution is cooled to room temperature, and there is added with stirring 258 parts of benzyl cyanide and 246 parts of nitrobenzene. The reaction mixture is cautiously warmed, maintaining a temperature of about 50° C. to about 55° C. for about four hours with stirring, and then cooled. One half of the reaction mixture is filtered, and the solid, a potassium salt of phenylcyanomethylene quinone oxime, is washed with methanol and dried. It is recrystallized from methanol to give a pure potassium salt of the oxime.

To the other half of the reaction mixture is added 2000 parts of water with stirring, then a solution of 250 parts of acetic acid in 500 parts of water is slowly added with stirring. After standing over night, the supernatant liquid is removed from the reaction mixture, 2000 parts of water is added with stirring, the mixture is filtered, and the solid is washed with water and then dried. This product is then heated in a boiling solution of 25 parts of acetic acid in 500 parts of benzene for about 15 minutes with stirring. The mixture is cooled, filtered and the solid washed with benzene and then dried. Upon drying there is obtained 204 parts (92% yield) of phenylcyanomethylene quinone oxime, melting with decomposition at 159–160° C. Recrystallized from benzene it melts with decomposition at 161° C. Analysis for phenylcyanomethylene quinone oxime; Calcd. C, 75.66; H, 4.54; N, 12.61. Found, C, 75.94; H, 4.62; N, 12.82.

The foregoing procedure is repeated with similar results using an equivalent amount of an alkaline condensing agent in each case in place of the potassium hydroxide, namely sodium hydroxide, sodium methoxide, potassium ethoxide, potassamide and sodamide respectively. In those cases in which a sodium-alkaline condensing agent is used, there is obtained a sodium salt in place of the potassium salt of phenylcyanomethylene quinone oxime. In some of the cases, not all of the alkaline condensing agent is dissolved by the methanol at the beginning of the reaction.

*Example II*

When potassium methoxide is used in place of potassium hydroxide, in the above procedure, there is obtained a potassium salt of phenylcyanomethylene quinone oxime and phenylcyanomethylene quinone oxime. When ethanol and also water respectively are used in place of methanol in the above procedure, the same products are likewise obtained. When sodium hydroxide is used in place of potassium hydroxide and a 50-50 solution of methanol and water is used in place of methanol in the above procedure, there is obtained a sodium salt of phenylcyanomethylene quinone oxime and phenylcyanomethylene quinone oxime. When ethylene glycol and propylene glycol respectively are used in place of methanol similar results are obtained.

*Example III*

Ten parts of phenylcyanomethylene quinone oxime is heated with 20 parts of acetic anhydride. Then 75 parts of carbon tetrachloride is added, and the mixture is heated to boiling and is filtered. Upon cooling and removing the liquid, there is obtained the acetyl derivative of phenylcyanomethylene quinone oxime, M.P. 134–136° C., recrystallized from carbon tetrachloride, M.P. 137–138° C. The same product is obtained when an equivalent amount of the potassium and of the sodium salt of the oxime respectively are used in place of the oxime.

Example IV

Five parts of phenylcyanomethylene quinone oxime, 10 parts of benzoyl chloride and 50 parts of carbon tetrachloride are heated to boiling. There is added 100 parts of carbon tetrachloride, and boiling is continued. The mixture is allowed to cool, is filtered and the solid obtained is heated in boiling benzene. The boiling benzene mixture is filtered, allowed to cool, and upon removal of the diluent, there is obtained the benzoyl derivative of phenylcyanomethylene quinone oxime, melting with decomposition at 186–187° C.

Example V

Twenty-five parts of the potassium salt of phenylcyanomethylene quinone oxime is dissolved in methanol. Equal portions of the solution are separately treated with methyl sulfate, allyl iodide and benzyl bromide, and there are obtained the methyl, allyl and benzyl derivatives respectively of phenylcyanomethylene quinone oxime.

Example VI

Twenty-eight parts of the potassium salt of phenylcyanomethylene quinone oxime is dissolved in water. Equal portions are treated separately with aqueous solutions of magnesium, calcium, zinc, barium, aluminum and cobaltous chlorides, and cupric, mercuric, lead, manganese, ferrous and chromic acetates, and there are obtained magnesium, calcium, zinc, barium, aluminum, cobalt, copper, mercury, lead, manganese, iron and chromium derivatives respectively of phenylcyanomethylene quinone oxime.

Example VII

Eighteen parts of phenylcyanomethylene quinone oxime is heated in boiling benzene. Equal portions of the resulting solution are treated with butyl isocyanate, phenyl isocyanate and 1-naphthyl isocyanate, and there are obtained the butyl urethan, phenyl urethan and 1-naphthyl urethan derivatives of phenylcyanomethylene quinone oxime.

Example VIII

The procedures of Examples I–VII are repeated using an equivalent amount of p-chlorobenzyl cyanide and its quinone oxime derivatives respectively in place of benzyl cyanide and its quione oxime derivatives and the corresponding products are derived therefrom. There are obtained p-chlorophenylcyanomethylene quinone oxime (77% yield) its potassium, sodium, magnesium, calcium, zinc, barium, aluminum, cobalt, copper, mercury, lead, manganese, iron and chromium derivatives and its acetyl, benzoyl, methyl, allyl, benzyl, butyl, urethan, phenyl urethan and 1-naphthyl urethan derivatives.

Example IX

The procedures of Examples I–VII are repeated using equivalent amounts respectively of p-methoxybenzyl cyanide and its quinone oxime derivatives in place of benzyl cyanide and its quinone oxime derivatives. There are obtained p-methoxyphenylcyanomethylene quinone oxime (77% yield) its potassium, sodium, magnesium, calcium, zinc, barium, aluminum, cobalt, copper, mercury, lead, manganese, iron and chromium derivatives and its acetyl, benzoyl, methyl, allyl, benzyl, butyl urethan, phenyl urethan and 1-naphthyl urethan derivatives.

Example X

The procedure of Examples I–VII are repeated using equivalent amounts respectively of o-methylnitrobenzene and its quinone oxime derivatives in place of nitrobenzene and its quinone oxime derivatives. There are obtained 2-methyl-4-(phenylcyanomethylene)-cyclohexa-2,5-diene-1-one oxime (70% yield), its potassium, sodium, magnesium, calcium, zinc, barium, aluminum, cobalt, copper, mercury, lead, manganese, iron and chromium derivatives and its acetyl, benzoyl, methyl, allyl, benzyl, butyl urethan, phenyl urethan and 1-naphthyl urethan derivatives.

Example XI

The procedures of Examples I–VII are repeated using equivalent amounts respectively of o-chloronitrobenzene and its quinone oxime derivatives in place of nitrobenzene and its quinone oxime derivatives. There are obtained 2-chloro-4-(phenylcyanomethylene)-cyclohexa-2,5-diene-1-one oxime (92% yield), its potassium, sodium, magnesium, calcium, zinc, barium, aluminum, copper, mercury, lead, manganese, iron and chromium derivatives and its acetyl, benzoyl, methyl, allyl, benzyl, butyl urethan, phenyl urethan and 1-naphthyl urethan derivatives.

Example XII

The procedure of Examples I–VII are repeated using equivalent amounts of respectively o-methoxynitrobenzene and its quinone oxime derivatives in place of nitrobenzene and tis quinone oxime derivatives. There are obtained 2-methoxy-4-(phenylcyanomethylene)-cyclohexa-2,5-diene-1-one oxime (79% yield), its potassium, sodium, magnesium, calcium, zinc, barium, aluminum, cobalt, copper, mercury, lead, manganese, iron and chromium derivatives and its acetyl, benzoyl, methyl, allyl, benzyl, butyl urethan, phenyl urethan and 1-naphthyl urethan derivatives.

Example XIII

A number of oximes of the above general Formula I wherein Y is hydrogen are prepared according to the following general procedure using the combination of reagents shown in Table II. In a suitable reaction vessel, 40 parts of potassium hydroxide is heated in 100 parts of methyl alcohol to effect solution. The alcoholic alkali is then cooled to about room temperature, and 10 parts of an arylacetonitrile and 10 parts of an aromatic nitro compound containing a hydrogen atom in the position para to the nitro group in 50 parts of methyl alcohol (which may be heated in order to effect solution) is added with stirring. The mixture is cautiously warmed, and a temperature of about 50–55° C. is maintained for about four hours with occasional stirring. The reaction mixture is then cooled and 200 parts of water is added with stirring, followed by the portionwise addition of a solution of 70 parts of acetic acid in 200 parts of water with stirring. After standing over night, the supernatant liquid is removed, and 400 parts of fresh water is added with stirring. The mixture is filtered, the solid is washed with water and then air dried. The solid is then boiled for about 15 minutes in a solution of 5 parts of acetic acid in 100 parts of benzene. After cooling, the mixture is filtered, washed with fresh benzene and air dried. Additional purification of the quinone oxime thus obtained is accomplished by recrystallization from benzene. Table II lists the arylacetonitriles and the aromatic nitro compounds used to produce the corresponding arylcyanomethylene quinone oximes of Formula I wherein Y is hydrogen along with the melting points and the percent yields of the quinone oximes. It is pointed out that minor variations of the general procedure described above are sometimes employed as is apparent to one skilled in the art. For example, in some reactions additional alcoholic alkali is used, aiding dilution. In other preparations the temperature and time of reaction are varied, and also the amount of benzene used for purification purposes is varied.

TABLE II

| Nitro Compound | Arylacetonitrile | M.P. (° C.) of Oxime | Percent Yield of Oxime |
|---|---|---|---|
| Nitrobenzene | Benzyl cyanide | 161(d.) | 92 |
| Do | p-Chlorobenzyl cyanide | 195(d.) | 77 |
| Do | p-Methoxybenzyl cyanide | 161(d.) | 85 |
| Do | 1-Napthylaceto-nitrile | 109(d.) | 65 |
| o-Nitrotoluene | Benzyl cyanide | 161(d.) | 72 |
| Do | p-Chlorobenzyl cyanide | 192–193(d.) | 60 |
| o-Nitrochlorobenzene | Benzyl cyanide | 180(d.) | 92 |
| Do | p-Chlorobenzyl cyanide | 190(d.) | 100 |
| o-Nitroanisole | Benzyl cyanide | 186(d.) | 87 |
| Do | p-Chlorobenzyl cyanide | 205(d.) | 80 |
| m-Nitrotoluene | Benzyl cyanide | 121–122(d.)* | 76 |
| Do | p-Chlorobenzyl cyanide | 173(d.) | 33 |
| m-Nitrochlorobenzene | Benzyl cyanide | 144(d.)* | 53 |
| Do | p-Chlorobenzyl cyanide | 177 (d.) | 100 |
| m-Nitroanisole | Benzyl cyanide | 146–147(d.) | 25 |
| Do | p-Chlorobenzyl cyanide | 188–189(d.) | 89 |
| 1-nitronaphthalene | Benzyl cyanide | 182–183(d.) | 33 |
| Do | p-Chlorobenzyl cyanide | 195–196(d.) | 88 |
| Do | p-Methoxybenzyl cyanide | 193–194(d.) | 36 |
| 2-methyl-5-chloronitrobenzene | Benzyl cyanide | 155(d.) | 92 |
| Do | p-Chlorobenzyl cyanide | 171(d.) | 87 |
| Do | p-Methoxybenzyl cyanide | 156(d.) | 88 |
| 2-chloro-5-methylnitrobenzene | Benzyl cyanide | 162(d.) | 77 |
| Do | p-Chlorobenzyl cyandie | 173(d.) | 77 |
| Do | p-Methoxybenzyl cyanide | 163(d.) | 80 |
| 2,5-dimethylnitrobenzene | Benzyl cyanide | 164(d.) | 53 |
| Do | p-Chlorobenzyl cyanide | 181(d.) | 43 |
| Do | p-Methoxybenzyl cyanide | 168(d.) | 69 |
| 2,5-dimethoxynitrobenzene | Benzyl cyanide | 193(d.) | 88 |
| Do | p-Chlorobenzyl cyanide | 200 (d.) | 80 |
| Do | p-Methoxybenzyl cyanide | 199(d.) | 65 |
| 2-methyl-3-chloronitrobenzene | Benzyl cyanide | 146 (d.) | 82 |
| Do | p-Chlorobenzyl Cyanide | 183(d.) | 80 |
| Do | p-Methoxybenzyl cynaide | 175(d.) | 80 |
| 2,5-dichloronitrobenzene | Benzyl cyanide | 170(d.) | 93 |
| Do | p-Chlorobenzyl cyanide | 184(d.) | 94 |
| Do | p-Methoxybenzyl cyanide | 178(d.) | 91 |
| 2-methoxy-5-chloronitrobenzene | Benzyl cyanide | 170(d.) | 82 |
| Do | p-Chlorobenzyl cyanide | 168(d.) | 81 |
| Do | p-methoxybenzyl cyanide | 173(d.) | 84 |
| 2,3-dichloronitrobenzene | Benzyl cyanide | 168 | 53 |
| Do | p-Chlorobenzylcyanide | 185 | 92 |
| Do | p-Methoxybenzyl cyanide | 180(d.) | 65 |

*Recrystallized from ethylene dichloride.

The above general procedure is suitable also for the preparation of the 1,2-quinoid or anthranil derivatives except that the reactions are ordinarily conducted at temperatures of about 0° C. to 30° C., and the acetic acid treatment and the boiling benzene treatment are ordinarily omitted. Purification of the anthranils is accomplished by recrystallization from petroleum ether, ethylacetate or alcohol.

The following Table III lists the arylacetonitriles and the aromatic nitro compounds used to produce the anthranil derivatives of Formula II, along with the melting points and percent yields of these derivatives.

TABLE III

| Nitro Compound | Arylacetonitrile | M.P. (°C.) of Anthranil | Percent Yield of Anthranil |
|---|---|---|---|
| p-Chloronitrobenzene | Benzyl cyanide | 115–117 | 46 |
| Do | p-Methoxybenzyl cyanide | 143–145 | 46 |
| Do | p-Chlorobenzyl cyanide | 214–215 | 46 |
| p-Bromonitrobenzene | Benzyl cyanide | 116–118 | 79 |
| Do | p-Methoxybenzyl cyanide | 134–135 | 69 |
| Do | p-Chlorobenzyl cyanide | 213–215 | 48 |
| 1,2-dichloro-4-nitro-benzene | Benzyl cyanide | 157–158 | 68 |

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

What I claim as new and what I desire to secure by Letters Patent of the United States, is:

1. A compound having the formula:

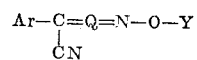

wherein Ar is a group selected from the class consisting of p-chlorophenyl and p-methoxyphenyl groups; Q is a 1,4-quinoid radical selected from the class consisting of the 1,4-benzoquinoid radical, the 1,4-naphthoquinoid radical, and substituted 1,4-benzoquinoid radical containing not more than two substituent groups thereon, said substituent groups on said 1,4-benzoquinoid radical being selected from the class consisting of —Cl, —CH₃ and —OCH₃; and Y is a radical selected from the class consisting of hydrogen, potassium and sodium.

2. p-Chlorophenylcyanomethylene quinone oxime.
3. p-Methoxyphenylcyanomethylene quinone oxime.

References Cited by the Examiner
UNITED STATES PATENTS 2,080,057   5/37   Neresheimer et al. _____ 260—465
2,561,190   7/51   Firestine _____ 260—307
2,907,775  10/59   Dunbar _____ 260—396

LORRAINE A. WEINBERGER, *Acting Primary Examiner.*

IRVIN MARCUS, DUVAL T. McCUTCHEN, LEON ZITVER, *Examiners.*